D. PINGER.
APPARATUS FOR DRAWING LARD, &c., FROM COOLERS.

No. 180,265. Patented July 25, 1876.

WITNESSES:
J. W. Herthel.
Chas. F. Meisner.

INVENTOR:
David Pinger
per. Herthel & Co
Attys.

UNITED STATES PATENT OFFICE.

DAVID PINGER, OF ST. JOSEPH, MISSOURI.

IMPROVEMENT IN APPARATUS FOR DRAWING LARD, &c., FROM COOLERS.

Specification forming part of Letters Patent No. 180,265, dated July 25, 1876; application filed April 7, 1876.

*To all whom it may concern:*

Be it known that I, DAVID PINGER, of St. Joseph, Buchanan county, and State of Missouri, have invented an Improved Apparatus for Drawing Lard and Liquid Matter from Coolers, &c., of which the following is a specification:

The ordinary method and means employed to "draw off" lard or fluid matter from a lard-cooler or vessel, to cool its contents to the required temperature for flow, filling, or packing purposes, is the employment and use of an ordinary stop-cock or faucet, and a funnel, placed in communication with the barrel, package, or tierces. The heads of the receptacles to be filled have, therefore, besides the plug-hole, a vent-hole, or, when the plug-hole is used, the vent must form part of the funnel. The said ordinary method and means are very impractical for the ends sought to be accomplished, for the packages, barrels, or tierces cannot be filled to the proper measure and capacity of the receptacle; much waste is incurred by overflow; the flow is irregular; the latter part thereof cools; no means are provided for shrinkage; and, notwithstanding great skill and watchfulness are constantly required of the operator, it is impossible for him to avoid the above difficulties. Hence, further, the heads of the packages, barrels, or tierces become greasy, untidy for market and use, and otherwise there is incurred loss of time, labor, and expense. All this to avoid is the object of my invention; and the nature thereof consists in providing the means and their manner of use, as I will now more fully describe.

Figure 1:
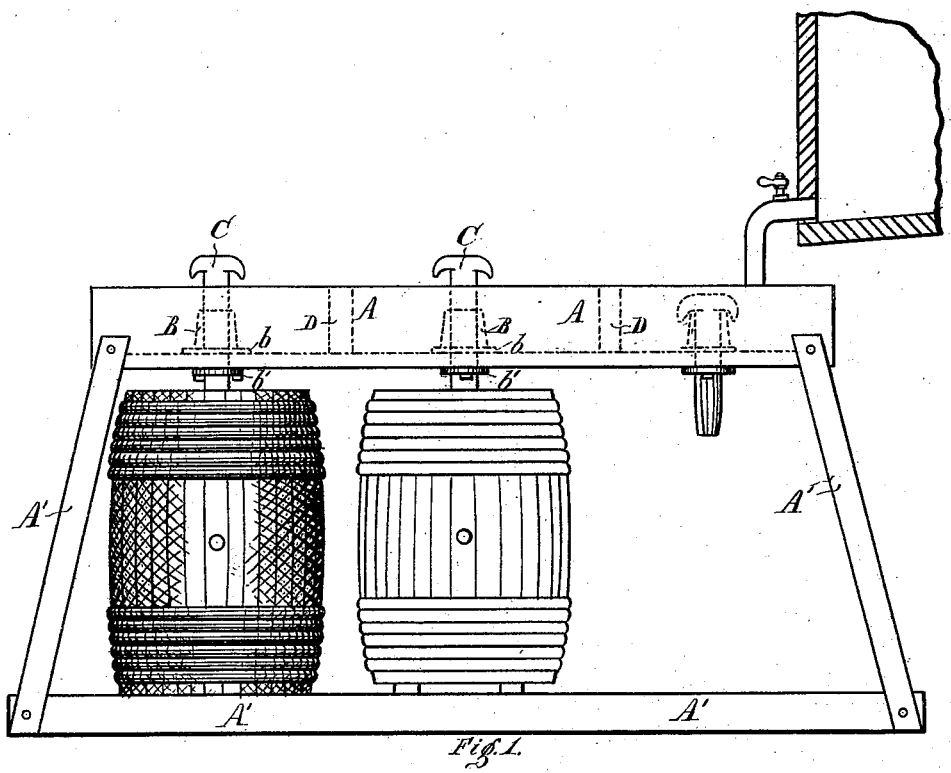
Figures 2, 3:
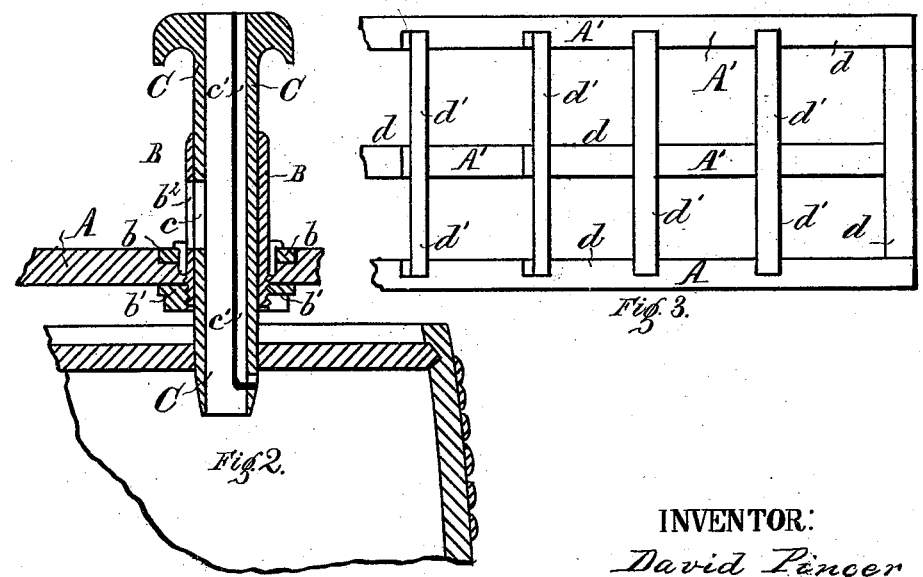

Of the drawing, Figure 1 is a front elevation, representing my invention as applied and used. Fig. 2 is an enlarged section of my improved faucet as applied in use with a trough and head of a tierce; Fig. 3 being a detail plan of the trestle as made to suit different sizes of tierces, this feature being also partly shown in Fig. 1.

As is customary, the flow of the lard or fluid is through a cock from the cooler or vessel to be emptied. I, however, avoid the use of a funnel, and in its stead, from the cock aforesaid, the flow of the lard or liquid is directly into a trough, A. This trough can be of any ordinary construction, supported top of a trestle or frame, A', as shown in Fig. 1. The bottom of the frame A' I construct so as to be adapted to receive different sizes of barrels, tierces, or packages, and as will hereinafter appear. The trough A and its supporting-frame A' can be of any length required according to the amount or number of receptacles to be filled from the cooler, and as indicated in Fig. 1. I provide within the trough A my improved faucet-body B. This consists of a cylinder open at top and bottom, and formed to have an annular flange at $b$, (see Fig. 2,) by means whereof a closing-joint top of the bottom of the trough can be had. The end of the faucet-body B, below its flange $b$, passes through a corresponding opening in the bottom of the trough. Said lower end of the body B has, further, screw-threads, so that a washer, $b'$, applied, (see Figs. 1 and 2,) will form the required closing-joint for securing the faucet-body to the bottom of the trough. At $b^2$ (see Fig. 2) the faucet-body has an inlet-opening, so as to establish communication from the trough to the head of the receptacle to be filled by the "turning on" or "shutting off" the spigot C. The spigot C I form of the proper length to rest and protrude top of its body B, and extend below same sufficiently to permit it to be inserted into the head of the barrel. This spigot I also provide with an inlet-opening at $c$, Fig. 2, to correspond when in line with the inlet $b^2$ of the body, and so that the flow takes place through both said openings; but can be shut off by simply turning the spigot either way, which presents the annular body of the spigot to close the inlet-opening of B. The spigot, therefore, fits within the bore of the body B, so as to be capable of being turned or placed in or taken out of its body B. The vent feature, to permit air to escape from the receptacle when filling, forms part of my spigot C. Thus, as shown in Fig. 2, $c'$ is the vent-tube, extending from the top to the lower end, where it has its outlet at the side. The air, as apparent, enters the vent-tube below and exits out of same at top. At top the spigot has proper handles for turning and lifting, and at bottom its bevel enters the usual opening in the head of the receptacle, and forms the required joint with same.

The parts being thus constructed and applied, the operation and manner of using are as follows: As stated, the flow of the lard or fluid is first in the trough A, being controlled by the ordinary stop-cock. The tierces to be filled are placed top of the bottom of the frame A', and their head-openings being brought in line with the raised spigot C, this is pressed down into the heads, and, further, by a turn-movement said spigot establishes inlet communication between trough and such tierce. The flow of the contents from the trough thus takes place into the receptacles, and it will be here noted that this flow is regular and constant, and that there can be no spurting or overflow, owing to the level in the trough. When the tierce is nearly full, or ready for removal, in shutting off the flow there will remain in the spigot a quantity of lard, &c., in excess of the contents in the receptacle and in the body of said spigot. This surplus I utilize and gain as a greater measure for the tierce and the like to contain, for all that is necessary is to slightly tap the head of the barrel to cause a shrinkage of its contents sufficient for said surplus also to enter and fill the receptacle. I am, therefore, enabled to fill a tierce, &c., more completely than has been heretofore done by the customary method, besides saving overflow, waste, and time for watching. A row of any number of tierces can thus be controlled with the greatest dispatch, neatness, and ease.

In case of casks, barrels, tierces, &c., only partly full, if it is desirable to direct the flow of the contents in the trough to said partly-filled receptacles, this can be readily done by a slide or partition, D, (see dotted lines, Fig. 1,) which slides in the sides of the trough. By changing the position of the slide in the trough its contents can be cut off or let on to any point along the trough.

I further provide means to adapt the frame A' to suit different sizes of packages, barrels, tierces, &c. The floor of the frame A', for this purpose, consists of the rectangular frame parts $d$, in which cross slats or frames $d'$ are fitted in proper corresponding mortises when laid flat, and thus present a smooth footing. In case a higher level is needed, the cross-slats $d'$ are positioned upright, as shown in Figs. 1 and 3, in the same mortises.

My invention is, therefore, simple and cheap for construction, most effective and advantageous in operation and for use, and applicable to all purposes where lard, oil, brine, or liquids require to be packed for transportation, shipping, and use.

What I claim is—

1. The trough A as an intermediate receptacle for the lard or fluid matter drawn from a lard cooler or vessel before filling of the tierces, and by means whereof the flow from said trough is had in a constant and regular manner, avoiding spurting and overflow, owing to the level of the fluid-matter in said trough.

2. The barrel-faucet or spigot C, having inlet-opening $c$, vent-tube $c'$, with relation to a faucet-body having inlet-opening, as and for the purpose set forth.

3. The combination of the spigot C, having inlet $c$, vent-tube $c'$, faucet-body B, having inlet $b^2$, and a trough, A, as and for the purpose set forth.

4. An improved faucet, of the character herein shown and described, with relation to a trough and lard-cooler or cooling-vessel, to operate in the manner and for the purpose set forth.

In testimony of said invention I have hereunto set my hand.

DAVID PINGER.

Witnesses:
WILLIAM W. HERTHEL,
CHAS. F. MEISNER.